Figure 1:
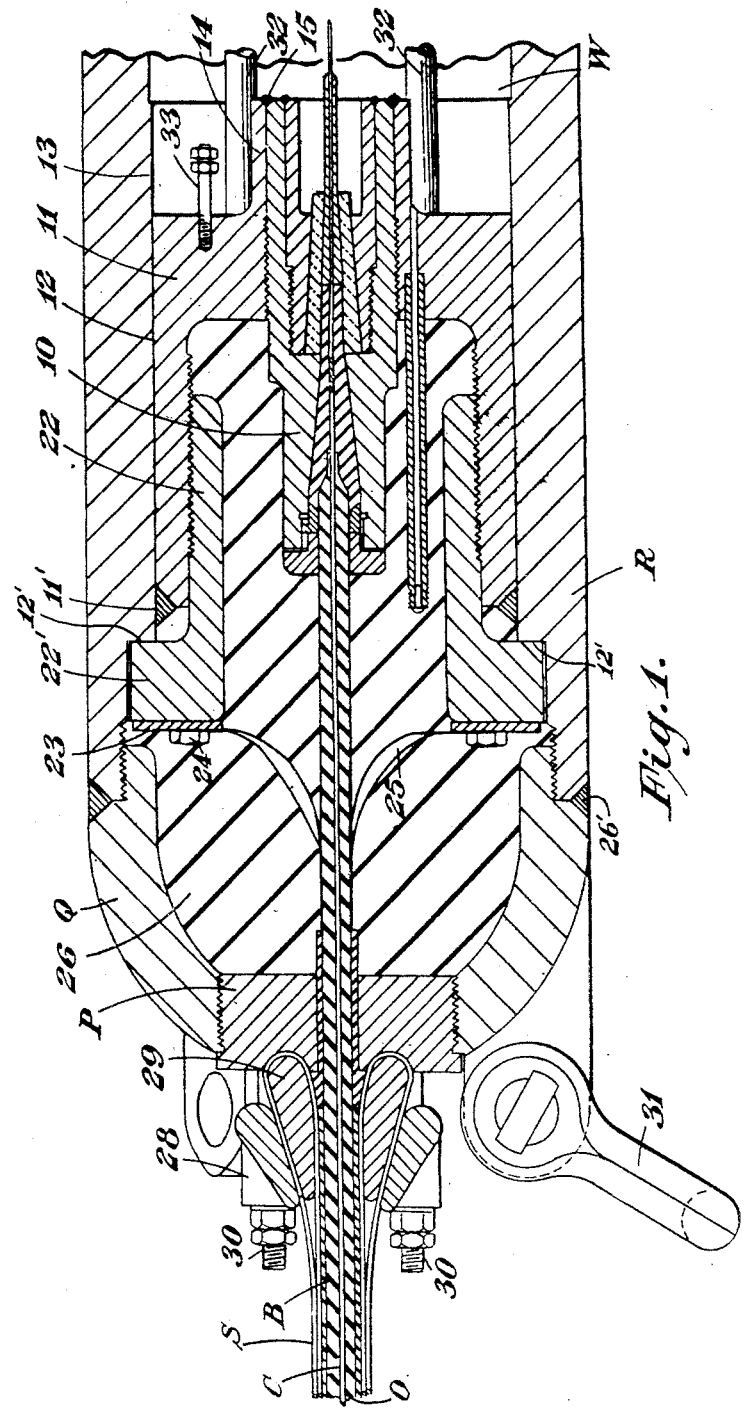

Dec. 21, 1954   R. W. PRESSWELL   2,697,739
SUBMARINE CABLE REPEATER HOUSING
Filed May 15, 1950   4 Sheets-Sheet 1

Inventor:
Richard William Presswell;
By his attorneys,
Baldwin, Wight & Brevost

Dec. 21, 1954   R. W. PRESSWELL   2,697,739
SUBMARINE CABLE REPEATER HOUSING
Filed May 15, 1950                                    4 Sheets-Sheet 2
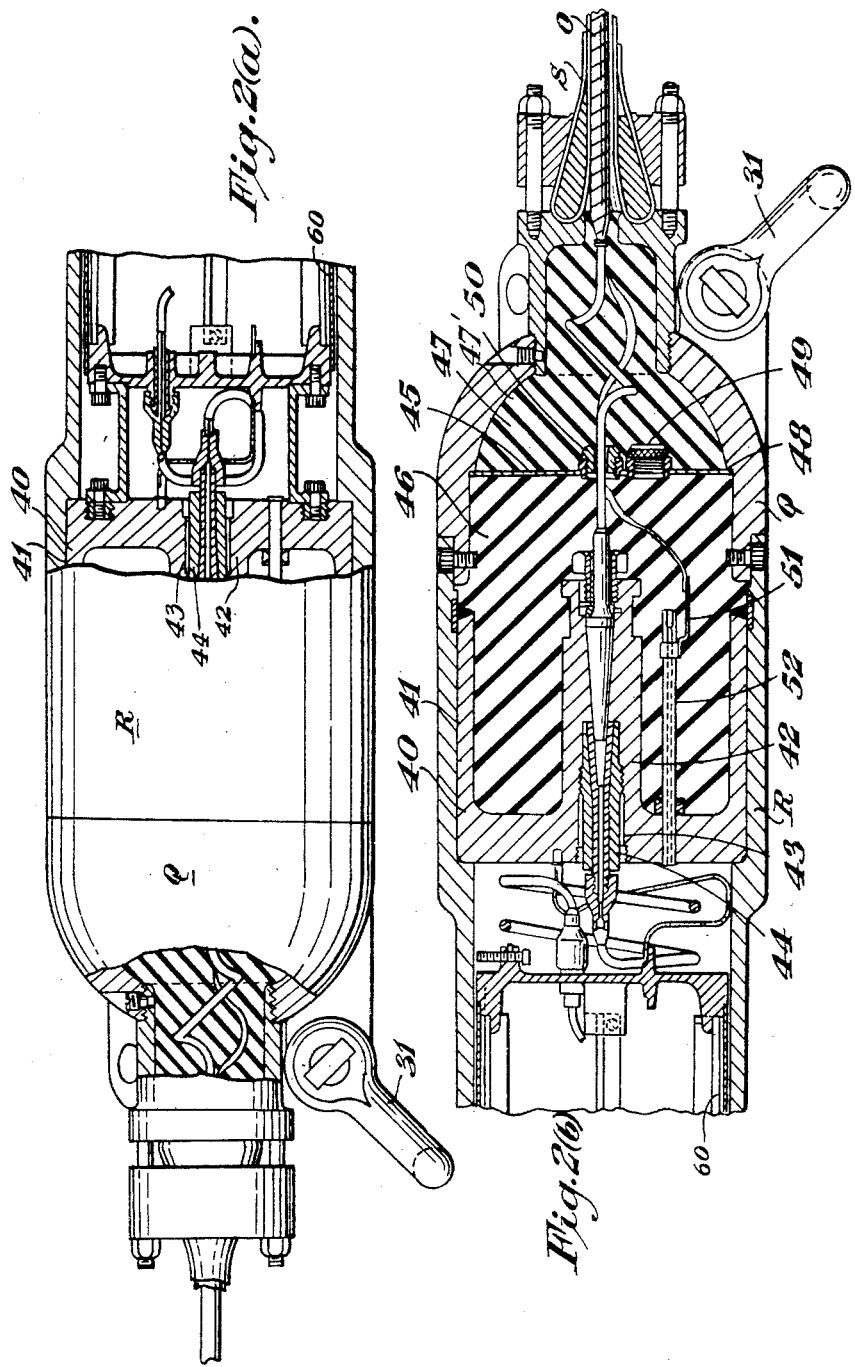
Inventor:
Richard William Presswell;
By his attorneys,
Baldwin, Wight, & Brevost

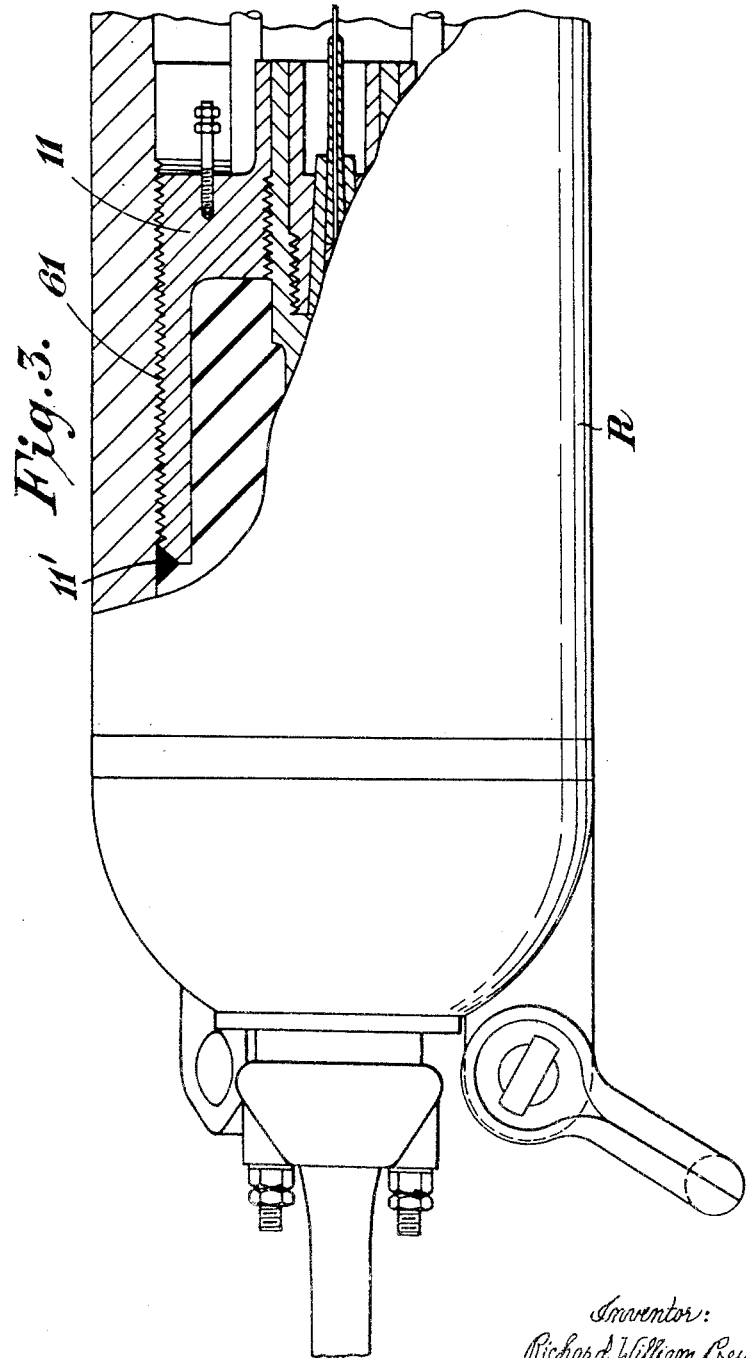

Dec. 21, 1954   R. W. PRESSWELL   2,697,739
SUBMARINE CABLE REPEATER HOUSING
Filed May 15, 1950   4 Sheets-Sheet 4
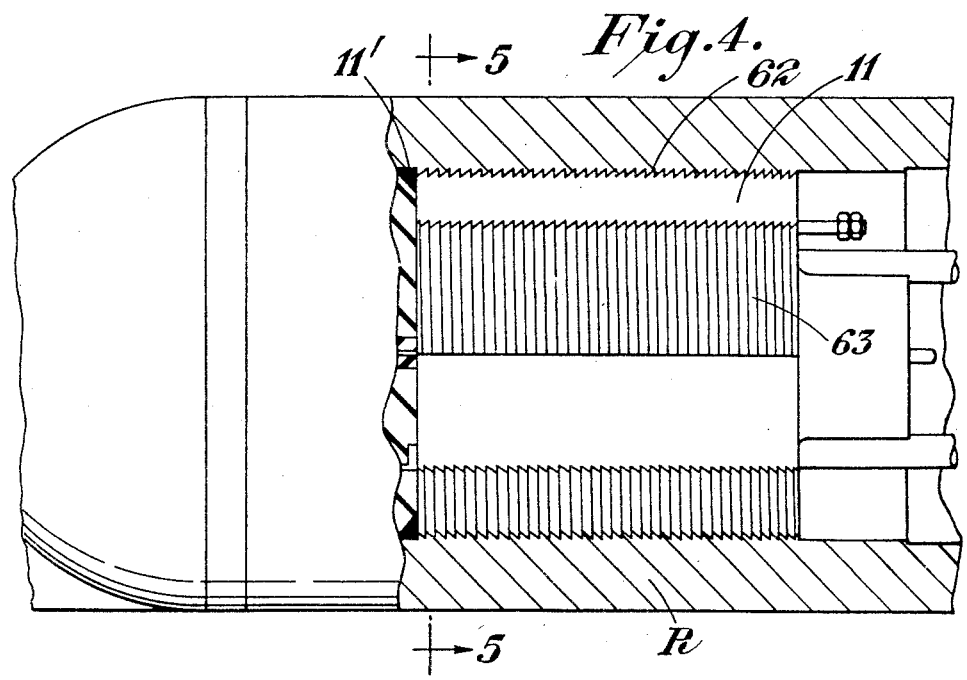
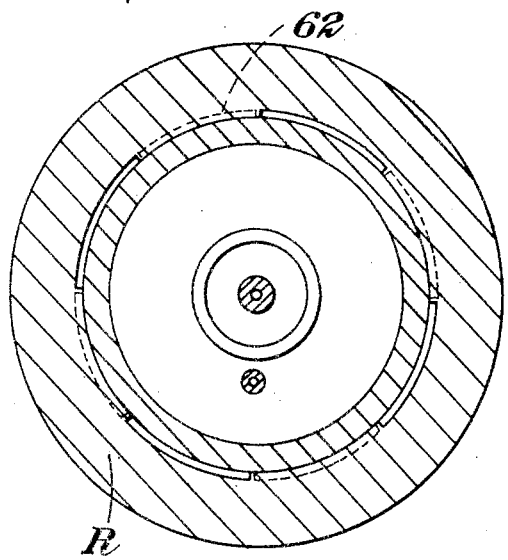
Inventor:
Richard William Presswell
Attorneys:
Baldwin & Wight United States Patent Office
2,697,739
Patented Dec. 21, 1954

2,697,739

SUBMARINE CABLE REPEATER HOUSING

Richard William Presswell, Kensington, London, England, assignor to Submarine Cables Limited, London, England, a company of Great Britain Application May 15, 1950, Serial No. 161,967

Claims priority, application Great Britain March 22, 1948

8 Claims. (Cl. 174—70)

This invention relates to submarine electric cables and more particularly to a container for housing repeaters or other auxiliary apparatus.

The present invention is concerned with and is a continuation-in-part of that described in my prior application Serial No. 81,325, filed March 14, 1949, now Patent 2,661,389, issued December 1, 1953.

Owing to the hydrostatic pressures prevailing at ocean depths and to which submarine cables laid at sea bottom level are therefore subjected, a repeater container has to withstand extremely high pressures and the present invention is concerned with an improved construction of container.

According to the present invention a container for housing a repeater or other auxiliary apparatus comprises an elongated tubular one piece metal casing of high tensile strength, and bulkhead sections located within an interior bore formed at each end of the casing and enclosing an interior compartment for the repeater or other auxiliary apparatus, each bulkhead having an aperture for the passage of the cable end, and being shrouded with an end cap piece secured to the end of the casing.

The bulkhead sections are preferably interconnected such as by spacer bars or split sleeves to eliminate torque being applied through the electrical apparatus which is housed within the chamber contained between the bulkhead sections. The spacer bars provide chassis factors on which the various electrical components such as amplifiers and equalizers can be mounted.

In one embodiment of the invention, the bulkhead section is in the form of a sleeve partly closed at one end by an end wall except for the cable opening, which is central, and the sleeve is secured, when in position, by means of a flanged holding ring, which is secured to the interior wall of the bulkhead sleeve by screwing and is itself located by means of its flange engaging an interior shoulder formed in the wall of the casing at each end. The central opening in each bulkhead section is threaded to receive a gland assembly member and both the bulkhead and gland assembly member may be extended axially towards the interior of the casing so as to increase the length of the path along which heat produced when welding the bulkhead to the casing must travel before reaching the heat-sensitive parts of the gland.

The interior surface of the casing should be machined accurately to receive the sleeve constituting the bulkhead section so that it is a close sliding fit therein and in order to prevent ingress of moisture along the jointing surfaces, the bulkhead is preferably united by annular welds both to the casing and to the gland assembly unit.

In the embodiment just described it will be understood that the bulkhead sections are fitted into the casing by sliding them into position and that they are subsequently locked against endwise displacement by means of the holding ring which screws into its interior.

In an alternative construction, the sleeve constituting the bulkhead section is directly fixed to the interior wall of the casing by screwing either with a full thread or with an interrupted thread, or the bulkhead section may be directly located within the interior bore of the casing by engagement at its inner end with a shoulder formed in the said bore.

According to a further feature of the invention the bulkhead outer compartments are provided with a steel or other suitable diaphragm to divide the compartment into inner and outer chambers, the inner chamber being filled with insulation material while the outer chamber provides accommodation space for a loop of the core.

The invention is illustrated in the accompanying drawings in which Figure 1 is a part sectional view showing one end only of a submarine cable repeater housing constructed in accordance with one embodiment of the invention. Figures 2a and 2b jointly are a part sectional view of an alternative design of repeater housing showing both ends of the housing. Figure 3 is a part sectional view of a repeater housing showing an alternative means of securing the bulkhead sections to the casing. Figure 4 is a similar part sectional view of the casing, and Figure 5 is a transverse section on the line 5—5 of Figure 4 of a further modification.

Referring to the drawings, R indicates generally the repeater casing or housing having an end cap Q at each end, an opening in which is closed by a gland plug P, plug P having a central opening for the passage of the cable, indicated generally at O, and which includes an inner conductor C with an outer cover B of dielectric material. S indicates the outer armourings.

In the repeater housing of this invention the casing R is in one piece and formed of metal having high tensile strength being provided at each end with bulkhead sections 11, which fit into each end of the casing and include between them a watertight compartment indicated at W for the repeater or like apparatus. Entrance to the compartment between the bulkhead sections 11 is by means of a central aperture in each bulkhead which is closed by a gland assembly member 10 (Figure 1) which screws into the said aperture. In the gland assembly members 10 are mounted a series of interfitting concentric sleeves which provide a mechanical seal to support a dielectric pudding in accordance with said prior application, Serial No. 81,325 now Patent 2,661,389.

The bulkhead sections 11 are a close fit within the main casing R, the latter being machined at each end to provide a bore 13 within which the outer diameter 12 of the bulkhead sections is a sliding fit. It will be observed that each bulkhead 11 terminates in a flange or collar 14 providing a skirt that is co-terminous with the gland assembly 10 and in order to prevent ingress of moisture between the jointing surfaces 10 and 14, welds 15 are provided at their inner ends.

In the construction shown the bulkhead sections 11 are interconnected by spacer bars 32 so that a torque or a rotational movement of the bulkhead at one end is transmitted to the bulkhead at the other end of the casing R. Alternatively in place of the spacer bars the two bulkheads may be connected by split sleeves (not shown).

Each bulkhead 11 after being inserted in position, is then sealed by means of an outer weld 11', after which a holding ring 22 (Figure 1) is screwed into position, the ring 22 having a peripheral flange 22' for engagement with an interior shoulder 12' formed at the outer end of the bore 13 of the casing the flange functioning as the means for locating the bulkhead section within the casing against endwise displacement.

25 are copper return conductor tapes, which are secured to the holding ring 22 by a bonding clamp 23 fastened in position by screws 24. The outer cap Q is provided with a screw flange to screw into the open end of the casing R and before closing up the open end of the casing by means of the gland plug P, the interior of the end cap Q is filled with a suitable dielectric 26, preferably a polythene-polyisobutylene compound. To prevent ingress of moisture and the end cap Q from coming unscrewed, a weld 26' is made at the joint line between the meeting faces of the casing and end caps.

Having screwed the plug P into position, the armouring wires S are fastened down by means of a conical locking ring 28 which co-operates with an inner cone 29, the whole forming a clamp held in position by clamping studs 30. 33 is an earthing terminal.

At each end, the casing is provided with lugs for mounting shackles 31 to which hawsers can be anchored in order to relieve the cable of the dead weight of the housing, the hawsers being stoppered to the cable at some distance away from the housing.

In the embodiment just described it will be understood that each bulkhead section is fitted into the casing by sliding it into position and subsequently locking it against endwise displacement by means of the holding ring 22 which screws into its interior.

In an alternative construction, the sleeve constituting the bulkhead section may be directly fixed to the interior wall of the casing by screwing either with a full thread or with an interrupted thread. Referring now to Figure 3, there is shown a casing R in which the bulkhead section 11 is secured directly to the casing R by means of a full screwthread 61. When the bulkhead section 11 has been screwed into position, it is sealed with a weld 11' to make the joint water-tight. Referring to Figure 4, there is shown a similar arrangement but using interrupted screw threads. The screw threaded portion of the interior of the casing is indicated at 62 while the screw thread sectors on the bulkhead section 11 are to be seen at 63. In the case where an interrupted thread is used, the repeater apparatus would be assembled and slid lengthwise into the casing and then twisted to lock the threads of the bulkhead sections and sealed with a weld 11' to make the joint watertight.

Referring now to Figure 2 there is shown an alternative embodiment of the invention in which the bulkhead section is constructed in the form of a cup member 40 which fits directly into a machined counterbore 41 in the casing R. With this arrangement the holding ring 22 is eliminated the member 40 being fixed in position and sealed against ingress of moisture by welding 41'. The bulkhead 40 it will be noted is formed with a central spigot 42 in which is a central aperture 43 to receive an insulator support 44 for the cable sealing gland, the spigot 42 replacing the separate gland assembly member 10 of Figure 1, so that instead of the gland assembly member being separate, in Figure 2 construction, it is in one piece with the bulkhead section.

The end caps Q instead of being detachably secured by screwing into the casing are formed with a flange 55 to fit the counterbore 41 and are locked in position by screw studs 56, the heads of which screw down flush with the sides of the casing. When the hawsers are stoppered to the cable it results in an amount of slack in the cable occurring between the housing and the stopper, and it is a further object of the invention to prevent the weight of this slack from imposing strain on the gland seal at the point where the cable passes through the bulkhead. For this purpose, the interior space between the bulkhead and the end cap Q is divided, according to a further feature of the invention, into inner and outer chambers 46, 47 by means of an outer bulkhead, which may consist of a steel or like diaphragm 45 located by a shoulder 48 in the end cap. The inner chamber is filled with insulation sealing compound, e. g. polythene or polyisobutylene and for this purpose the bulkhead 45 is provided with a filler plug 49 in addition to the cable bush 50 for the entry of the cable.

It will be noted that the accommodation space within the outer chamber 47 is further increased by the use of a gland plug of hollow cup-shaped form.

As can be seen, the outer chamber 47 provides accommodation space for a loop in the cable core so that any longitudinal stress imposed by the weight of the cable slack when the casing is stoppered to the cable merely results in straightening out the loop. The copper return tape in this construction is secured to an earth tag 51 attached to a copper gas filling tube 52 which is mounted in an aperture in the bulkhead 40 so as to give access to the interior of the housing R. The outer compartment 47 may or may not be sealed by filling it with a cable compound, e. g. polythene-polyisobutylene as indicated at 47'. In practice, it will be found that there is no necessity to seal the "ante chamber" 47 against ingress of sea water and in fact, holes (not shown) can be made in the wall or end cap of the casing through which water can readily flow. As shown in Figure 2b the repeater apparatus may be enclosed in a secondary sealed casing or chassis indicated generally at 60.

I claim:

1. A submarine cable repeater housing comprising an elongated tubular casing formed in one piece of high tensile metal in which is provided an interior compartment for the repeater apparatus, cup-shaped bulkhead sections enclosing the ends of said compartment, a holding ring associated with and screwing into each bulkhead section, said casing having an interior bore to receive each of said bulkhead sections through sliding movement and being formed with shoulders against which are located the holding rings, and end caps detachably secured to each end of the casing.

2. A submarine cable repeater housing as set forth in claim 1 wherein each bulkhead section is formed with a skirt and the skirt and the gland assembly member are extended axially to provide a seal rendered watertight by welding and whereby the heat generated when welding is separated from the cable sealing gland in the gland assembly member.

3. A submarine cable repeater housing as set forth in claim 1 in which a weld is provided between the outer end of each bulkhead section and the interior of the casing.

4. A submarine cable repeater housing as set forth in claim 1 having means rigidly interconnecting the bulkhead sections so that torque of one bulkhead section is transmitted to the other bulkhead section.

5. A submarine cable repeater housing comprising an elongated tubular casing having its bore open throughout, said casing inwardly of each end having an annular shoulder, bulkhead sections disposed in said bore inwardly of said shoulders and spaced apart and providing a compartment for repeater apparatus, a holding member engaging and positioning each bulkhead section, said holding members having shoulders respectively abutting the first-mentioned shoulders, a casing-closing end cap threaded to each end of said casing outwardly of said bulkhead sections, said bulkhead sections and end caps having openings therethrough and said holding members being tubular so that cable may be accommodated therethrough.

6. A submarine cable repeater housing comprising an elongated tubular casing having its bore open throughout, said casing inwardly of each end having an annular shoulder, bulkhead sections disposed in said bore inwardly of said shoulders and spaced apart and providing a compartment for repeater apparatus, means whereby movement of one bulkhead section will be imparted to the other bulkhead section, a holding member engaging and positioning each bulkhead section, said holding members having shoulders respectively abutting the first-mentioned shoulders, the outer end surfaces of said holding means extending inwardly with respect to said bore to facilitate attachment of conductor tapes thereto, casing-closing end caps screw-threaded to each end of said casing, gland plugs at the outer ends of said caps, said gland plugs and said bulkhead sections having openings therethrough and said holding members being tubular so that cable may be accommodated therethrough.

7. A submarine cable repeater housing as set forth in claim 1 in which said end caps are screw threaded to the interior of the casing outwardly of the bulkhead sections.

8. A submarine cable repeater apparatus as set forth in claim 5 wherein the bulkhead sections are rigidly interconnected by spacer bars.

References Cited in the file of this patent

UNITED STATES PATENTS

| Number | Name | Date |
| --- | --- | --- |
| 1,103,130 | Cunningham et al. | July 14, 1914 |
| 2,292,358 | Bishop | Aug. 11, 1942 |
| 2,471,046 | Smith et al. | May 24, 1949 |
| 2,471,468 | Weston | May 31, 1949 |